United States Patent [19]

Schneck

[11] Patent Number: 5,384,965

[45] Date of Patent: Jan. 31, 1995

[54] VEHICLE TIRE-TO-BODY COVERAGE CHECKING FIXTURE AND METHOD OF USING SAME

[75] Inventor: Elden E. Schneck, Troy, Mich.

[73] Assignee: Chrysler Corporation, Highland Park, Mich.

[21] Appl. No.: 113,120

[22] Filed: Aug. 30, 1993

[51] Int. Cl.6 .............................................. G01B 5/14
[52] U.S. Cl. ................................. 33/203; 33/203.15; 33/600
[58] Field of Search ............... 33/203, 203.12, 203.15, 33/600, 608

[56] References Cited

U.S. PATENT DOCUMENTS

| | | | |
|---|---|---|---|
| 1,840,766 | 1/1932 | Creagmile | 33/203.15 |
| 2,090,294 | 8/1937 | Haucke | 33/203.15 |
| 2,435,644 | 2/1948 | Beckett et al. | 33/203.12 |
| 4,457,075 | 7/1984 | Murata | 33/203.15 |
| 4,498,244 | 2/1985 | Bendickson | 33/203.15 |
| 4,625,419 | 12/1986 | Beissbarth | 33/203.15 |
| 4,953,307 | 9/1990 | Loucas | 33/600 |

Primary Examiner—William A. Cuchlinski, Jr.
Assistant Examiner—G. Bradley Bennett
Attorney, Agent, or Firm—Edward P. Barthel

[57] ABSTRACT

A solid, non-adjustable checking fixture adaptable for use in checking distances at selected angles off vertical to each of the tires and fenders or other type guards over the tires of all vehicle models. The fixture serves to permit fast and efficient manual checking of such distances in order to comply with E.E.C. "European Tire Coverage Standard." The fixture includes plates mounted on a base at the specified angles, and markings on the base having scales proportioned horizontally to heights of respective points along the angled plates corresponding to the vertical heights of the centers of the wheel axles.

5 Claims, 4 Drawing Sheets

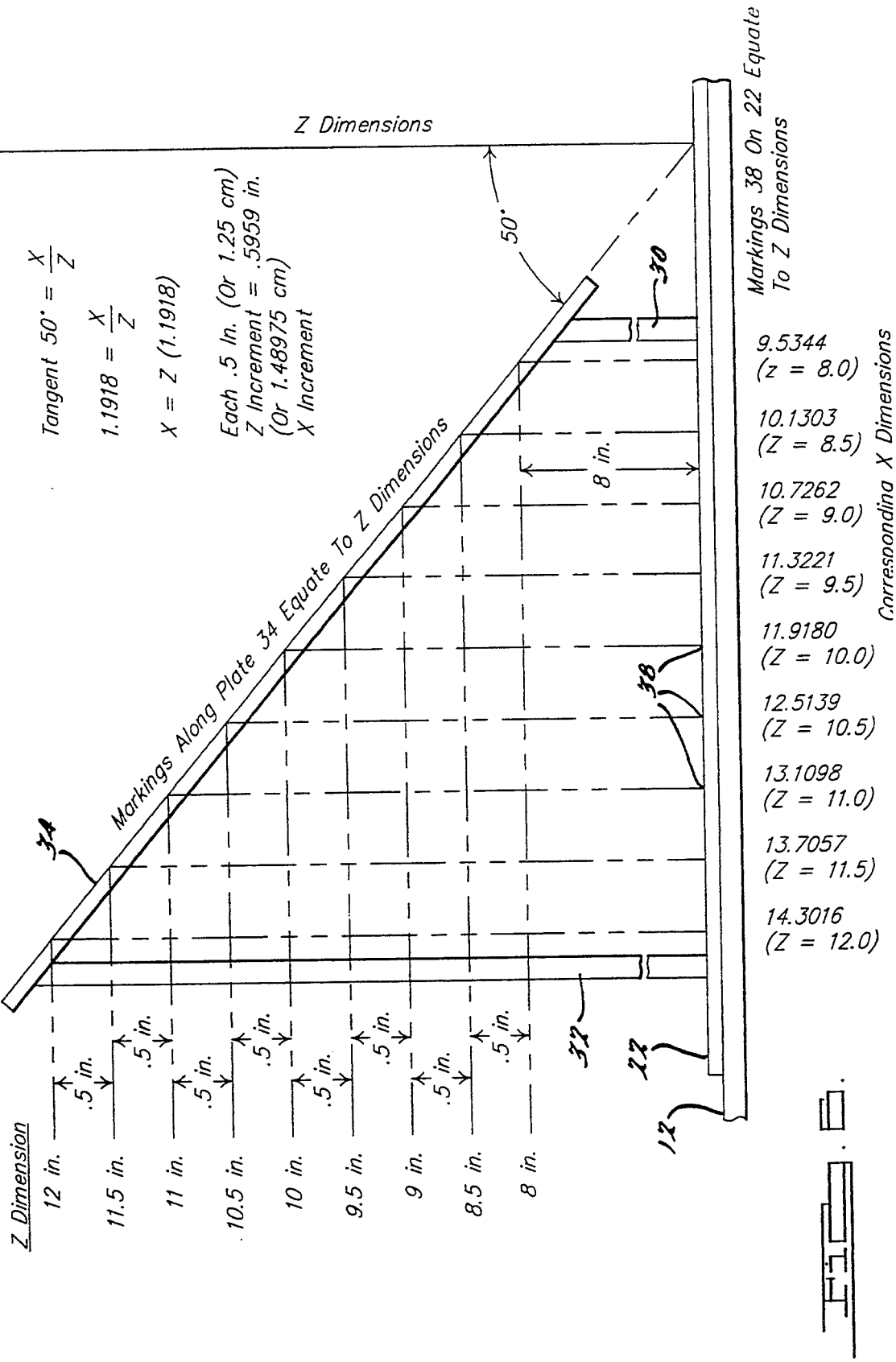

VEHICLE TIRE-TO-BODY COVERAGE CHECKING FIXTURE AND METHOD OF USING SAME

TECHNICAL FIELD

This invention relates generally to dimension checking fixtures and, more particularly, to a vehicle model tire coverage checking fixture and method of using same.

BACKGROUND OF THE INVENTION

Within the E.E.C. there exists a "European Tire Coverage Standard", which states as follows: "In the part formed by the radial planes at 30° to the front and 50° to the rear of the centre of the wheels, the guards must be sufficient to cover the total tire width taking into account the extremes of tire/wheel combination as specified by the manufacturer." The Standard excludes protective bands, ribs labelling and decorations on the tire.

In view of the Standard, every model vehicle destined for sale in the European community must meet the stated requirements. Hence, careful analysis is required for vehicle models in the preliminary clay model and/or early design stages. Heretofor, such dimensional checks were tediously manually scaled without the use of a checking fixture for assisting in the checking operation. Therefor, it is desirable to have a "tire coverage checking fixture" which provides automotive designers the means to readily and accurately make the required dimensional tire profile to body checks for all vehicle models.

A known gauge for measuring the fender well width of an automobile and the distances from the inner and outer sides of the well to the hub is disclosed in Loucas U.S. Pat. No. 4,953,307. From such measured dimensions, one can determine the widest usable tire, and calculate rim offset in a rim suitable for the selected wide tire.

DISCLOSURE OF THE INVENTION

Accordingly, a general object of the invention is to provide an improved method of checking tire coverage of vehicle models destined for sale in the European community in compliance with European Tire Coverage Standard, and to provide a tire coverage checking fixture for carrying out the method.

Another object of the invention is to provide a tire coverage checking fixture which contains no adjustable parts, but which is adaptable to easily, quickly, and accurately checking the dimensions cited in the European Tire Coverage Standard, for all vehicle models.

A further object of the invention is to provide a tire coverage checking fixture which includes two plates fixed on a base at respective 30° and 50° off vertical so as to diverge upwardly from one another, in keeping with the angles specifically identified in the European Tire Coverage Standard.

Still another object of the invention is to provide such a tire coverage checking fixture having horizontal scales identified on the base thereof along the longitudinal X-axis proportioned to respective heights of selected points along the above referenced respective 30° and 50° angle plates.

A still further object of the invention is to provide such a tire coverage checking fixture having two horizontal scales on the base thereof along the X-axis respectively identifying opposite sides for respective adjacent sides of the 30° angle, and opposite sides for respective adjacent sides of the 50° angle.

Yet another object of the invention is to provide a tire coverage checking fixture which is adaptable to slide along a line parallel to the centerline X-axis of a vehicle model, and which includes horizontal scales proportional to a predetermined height, i.e. a vehicle's curb height along the vertical Z axis through the model's axle centerline, and upwardly diverging plates on respective 30° and 50° angles off vertical, for measuring the relative distances along these angles to the respective front and rear portions of each tire and its associated guard or fender, to determine compliance with the European Tire Coverage Standard.

These and other objects and advantages will become more apparent when reference is made to the following drawings and the accompanying description.

BRIEF DESCRIPTION OF THE DRAWINGS

FIG. 6 is a further diagrammatic illustration of a feature of the invention.

BEST MODE OF CARRYING OUT THE INVENTION

Figure 1:
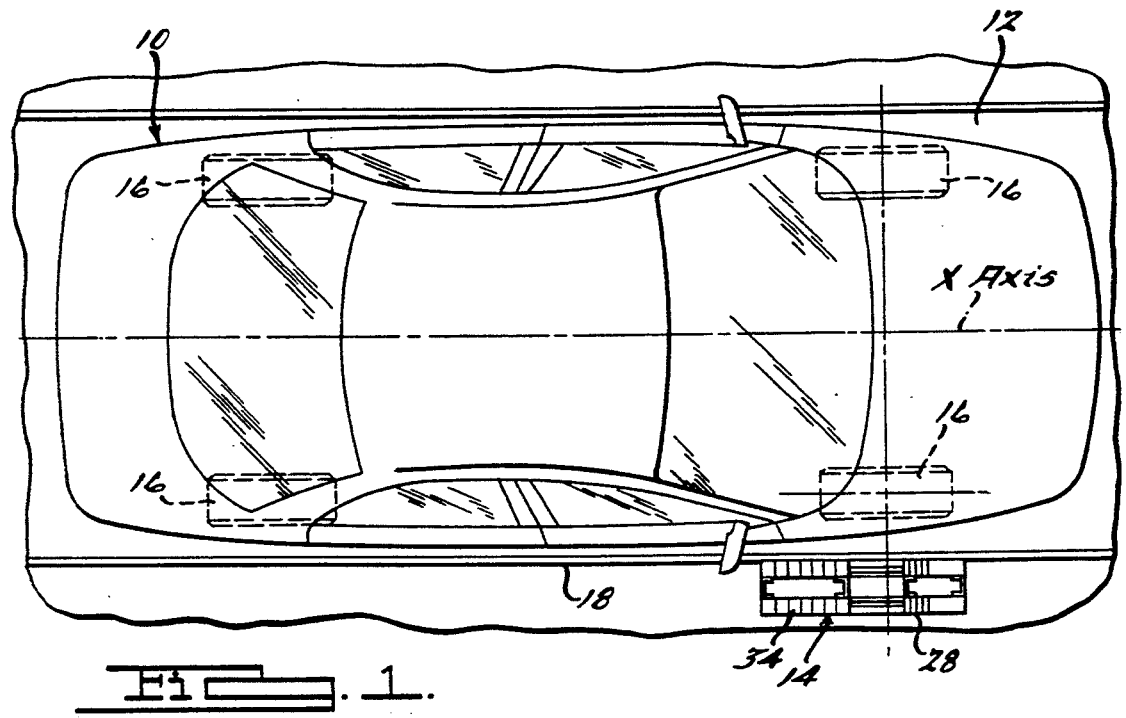
FIG. 1 is a plan view of a vehicle model placed on a platform, with the inventive tire coverage checking fixture mounted adjacent thereto.

Referring now to the drawings in greater detail, FIG. 1 illustrates a vehicle model 10 positioned on a platform 12, with the centerline or longitudinal X-axis of the model aligned with the centerline of the platform. A body fender to tire profile coverage checking fixture 14 is positioned adjacent a tire 16 and fender 17 (FIGS. 2 and 3) of the vehicle model 10, abutted against a reference rail 18 mounted along a side of the platform 12 parallel to the X-axis centerline. Markings 20 (FIG. 4) at predetermined increments are marked along the reference rail 18 to identify locations of the vehicle model 10 wheel bases as measured between the respective lateral Y-axes across the vehicle through the front and rear wheel axle centerlines. The Z-axis extends vertically through the axle 21 centerlines, and referred to hereinafter, serves to define the height(s) of the centers of the wheel axles 21 at, so-called, curb positions of the vehicle model 10. Curb height generally refers to the position of the vehicle axle as if the vehicle were carrying a driver only and a half tank of fuel.

Figure 2:
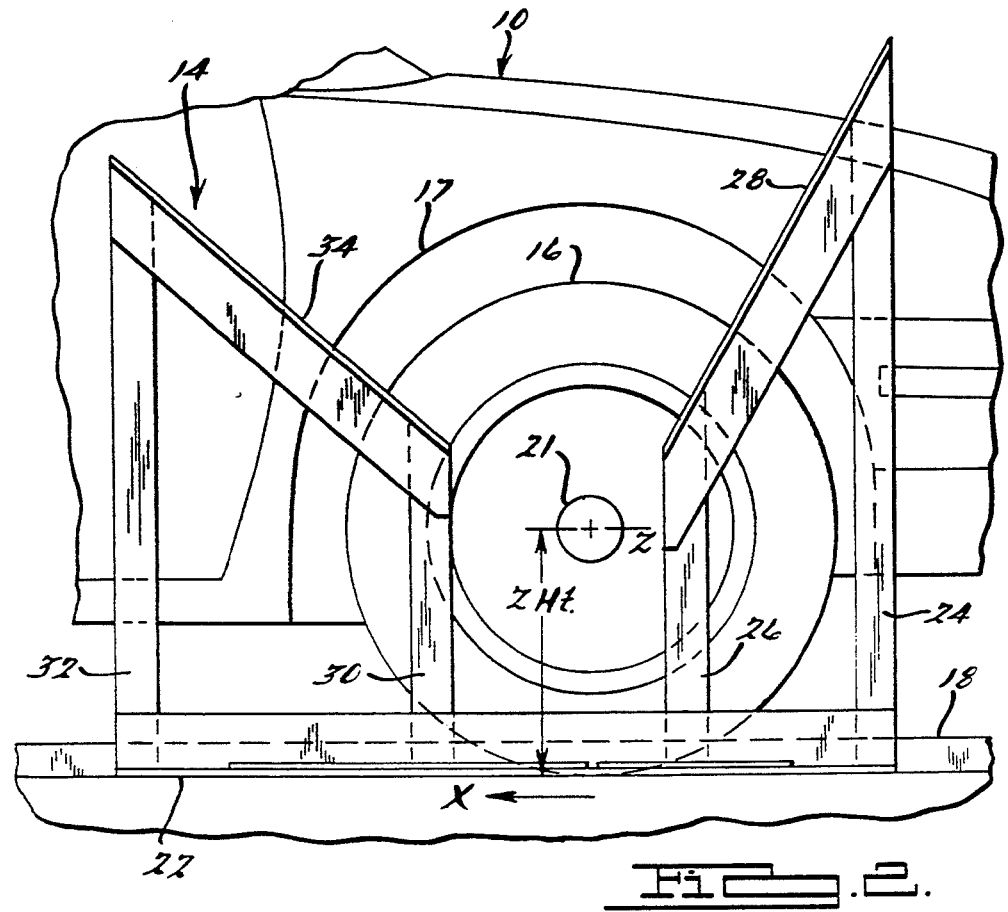
FIG. 2 is n enlarged side elevational view of the invention adjacent a fragmentary vehicle model.
Figure 4:
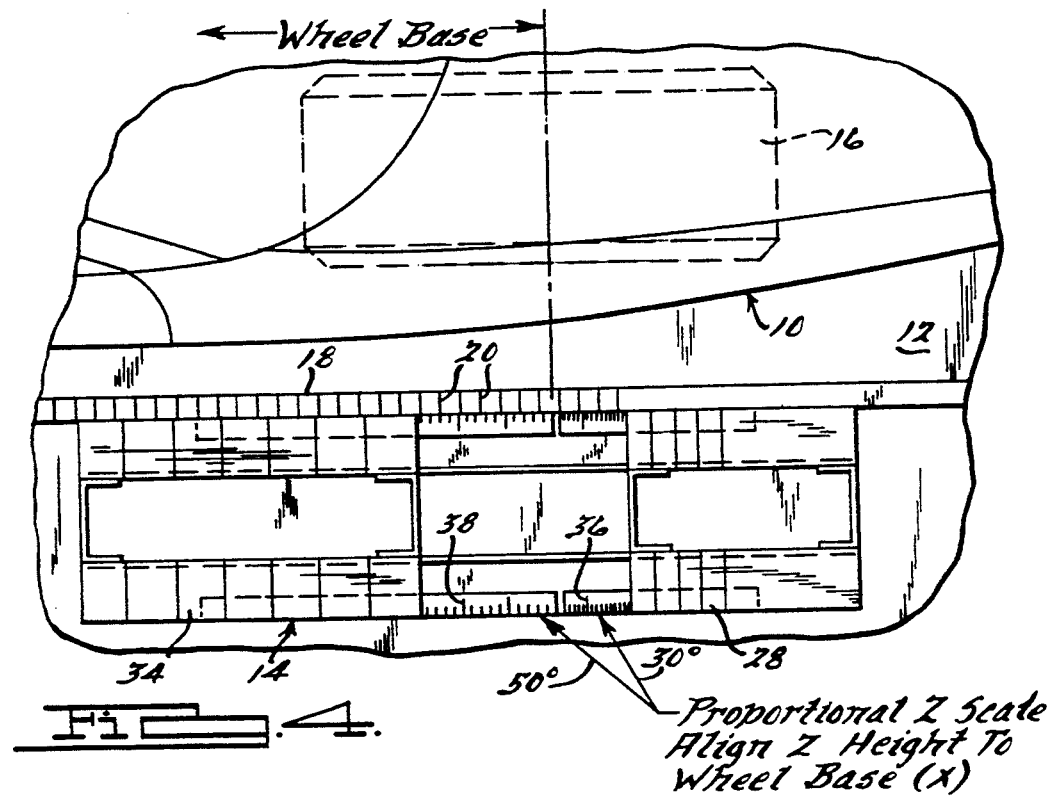
FIG. 4 is an enlarged plan view of the inventive portion of FIG. 1.
Figure 3:
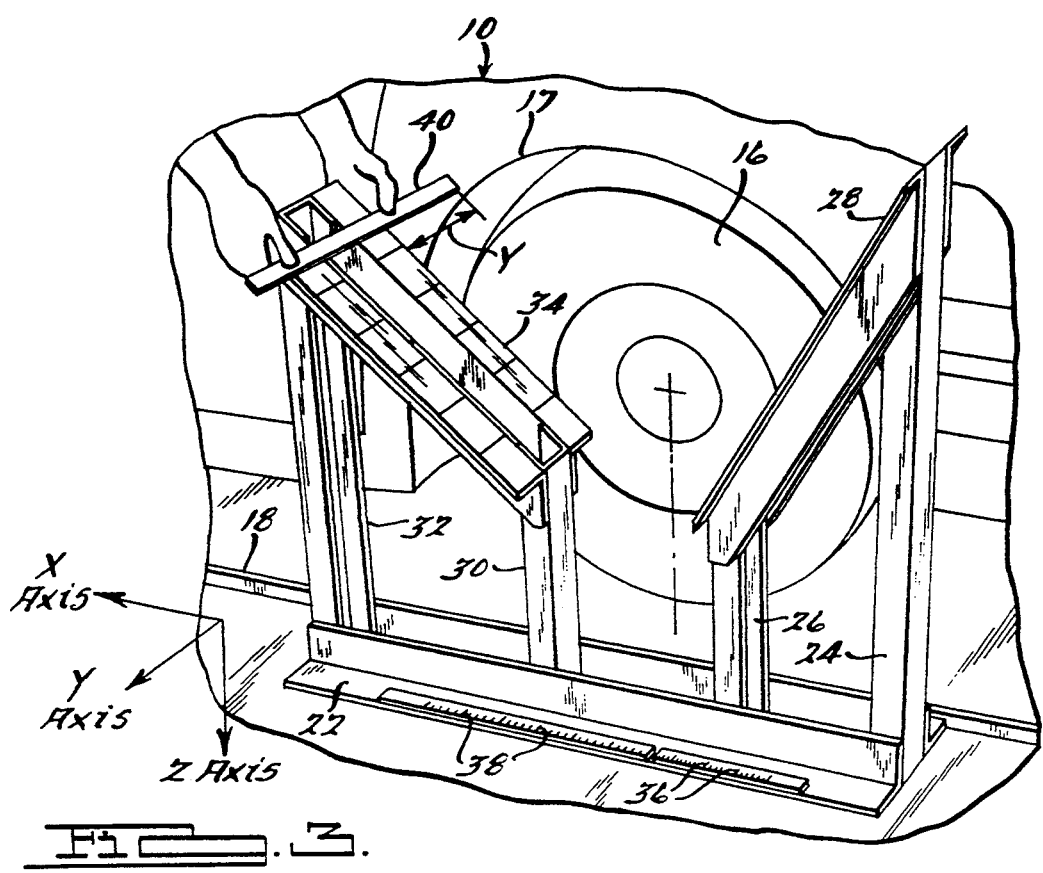
FIG. 3 is a perspective view of the FIG. 2 structure, and illustrating an operational use of the invention.

As shown in FIGS. 2-4, the tire coverage checking fixture 14 includes a base 22, a front pair of fixed support posts 24 and 26 extending vertically from the base 22 to support a first checking plate 28 sloped on an angle of 30° off vertical, a second pair of fixed support posts 30 and 32 extending vertically from the base 22 to support a second checking plate 34 sloped on an angle of 50° off vertical.

Markings 36 and 38 on the base 22 reflect the tangents of the respective 30° and 50° angles of the plates 28 and 34 relative to various Z dimensions from the platform to the axle 21 center, i.e., the markings relative to the 30° and 50° angles identify particular opposite horizontal side dimensions "X" for selected adjacent vertical side dimensions "Z", with the surfaces of the respective plates 28 and 34 providing the hypotenuse dimensions.

Figure 5:
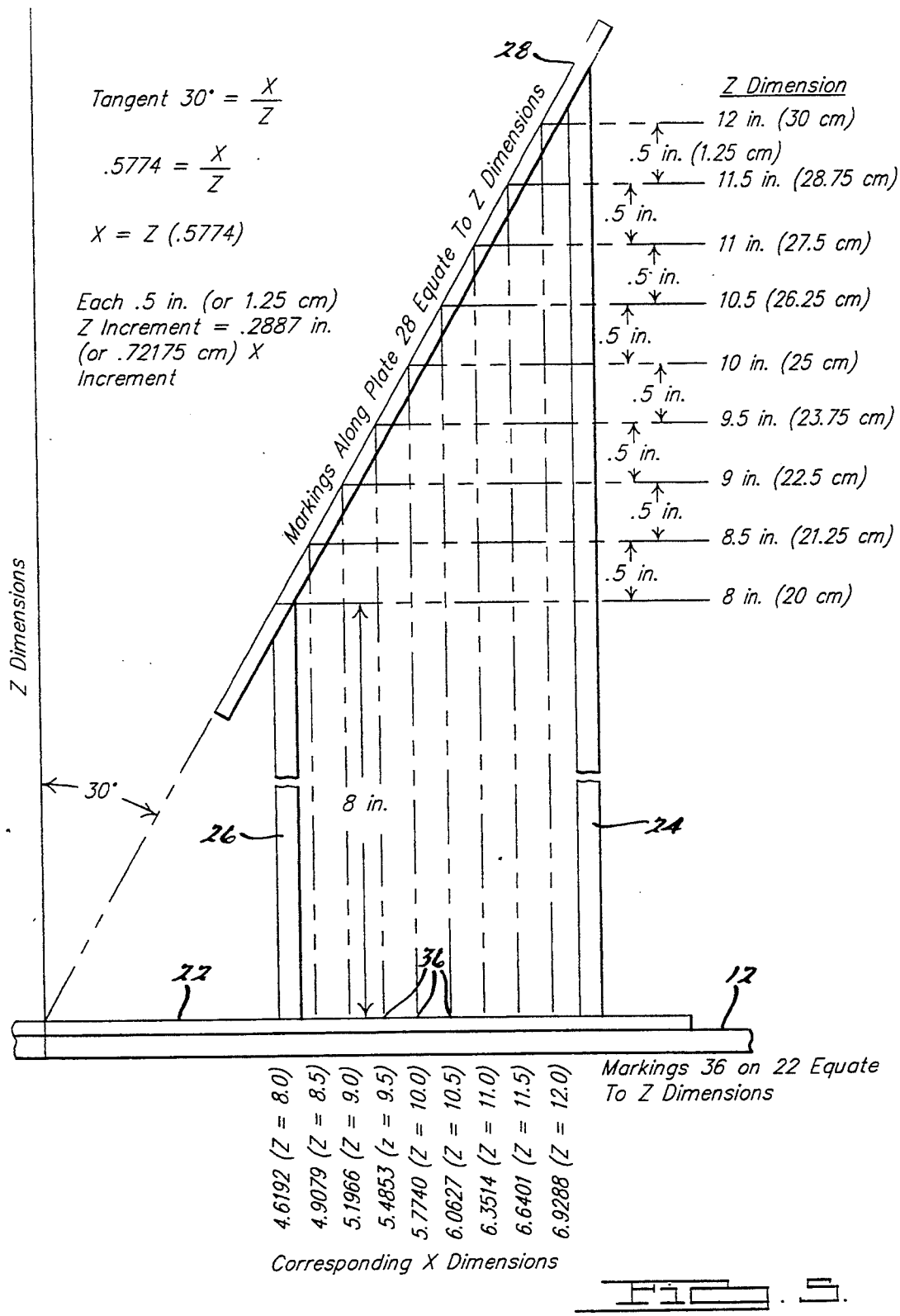
FIG. 5 is a diagrammatic illustration of a feature of the invention.

More specifically, as illustrated in FIG. 5, inasmuch as opposite, adjacent angles are equal, and the tangent of 30°=0.5774, the X dimension for a Z axle 21 centerline height of 8 inches, for example, is determined from $$\tan 30° = \frac{X}{Z} \text{ or } .5774 = \frac{X}{8}$$

$$X = 8(.5774)$$

or X=4.6192, and for a Z axle 21 centerline height of 12 inches, X=12(0.5774)=6.9288, and so on, as shown.

As illustrated in FIG. 6, inasmuch as the tangent of 50°=1.1918, the X dimension for a Z axle 21 centerline height of 8 inches=8(1.1918)=9.5344, and for a Z axle 21 centerline height of 12 inches=12(1.1918)=14.302, and so on, as shown.

From a practical user-friendly standpoint, the markings 36 and 38 may simply indicate axle centerline heights, or any other readily recognizable markings.

Thus, it is apparent that, if markings 36 and 38 at points along the base 22 are identified with the respective Z axle 21 centerline height dimensions, as indicated in FIGS. 5 and 6, the fixture 14 may be easily and readily slid along the reference rail 18 to align the desired Z marking corresponding to the height of the axle 21 center at curb height with the mark on the rail 18 which identifies the vertical centerline of the wheel axle. Then, for the respective 30°, and 50° placements, in turn, a scale 40 (FIG. 3) is manually placed across one of the checking plates 28 and 34 to first touch the tire 16 of a vehicle model in its design or "in platform" position, and measure the distance thereto. By "in platform" is meant on a platform at curb height with the X-axis centerlines of the model and platform aligned intermediate the oppositely disposed reference rails 18. The scale 40 is next moved to a position on the respective plate so as extend to touch the fender 17 or guard edge to measure the distance thereto. The latter distance must be less than the former distance to comply with the Standard. The operation is repeated for the other plate 28 or 34, and then for each of the remaining three wheels 16 and fenders 17.

INDUSTRIAL APPLICABILITY

It should be apparent that the invention provides an efficient and readily usable fixture for quickly and accurately checking the wheel coverage at the front 30° angle off vertical and the rear 50° angle off vertical for each of the two front and two rear wheels.

While but one embodiment of the invention has been shown and described, other modifications thereof are possible within the scope of the following claims.

What is claimed is:

1. A tire to body coverage checking fixture for a tire in its design position, comprising a base, a first checking plate mounted on said base at a first selected angle off vertical, a second checking plate mounted on said base at a second selected angle off vertical, first markings on said base beneath said first checking plate having a scale proportioned horizontally to heights of respective points along said first selected angle plate, and second markings on said base beneath said second checking plate having a scale proportioned horizontally to heights of respective points along said second checking plate, wherein said first and second selected angles off vertical are 30° and 50°, respectively.

2. The tire coverage checking fixture described in claim 1, and fixed support posts between the base and each of said first and second checking plates.

3. A tire coverage checking fixture comprising a base, a first checking plate mounted on said base at a 30° angle off vertical, a second checking plate mounted on said base at a 50° angle off vertical, first markings on said base beneath said first checking plate having a scale identifying the tangents of selected segments of said 30° angle, and second markings on said base beneath said second checking plate having a scale identifying the tangents of selected segments of said 50° angle.

4. A method of checking the coverage of vehicular tire guards or fenders relative to the outer surfaces of the tires fore and aft predetermined angles off a vertical centerline through the center of each wheel on which a tire is mounted, the method comprising the steps of:

a. placing a vehicle model "in platform", i.e., on a platform at curb height with the X-axis centerlines of the model and platform aligned intermediate oppositely disposed reference rails having a scale thereon suitable for identifying the model's wheel base dimension between axle centerlines along the X-axis;

b. abutting a tire coverage checking fixture against the outer edge of one of said reference rails, said fixture including a base having a first checking plate fixedly mounted thereon at a first selected angle off vertical toward the front of the model and a second checking plate fixedly mounted thereon at a second selected angle off vertical toward the rear of the model, with a scale marked along said base proportioned to heights of selected points along said respective plates;

c. sliding said fixture along said platform and said reference rail until a mark on said base beneath one of said first and second selected angled plates coincides with a predetermined axle height of the vertical Z-axis at the center of a selected wheel axis relative to the vehicle model in platform;

d. manually placing a scale on said first checking plate and extending same to abut against the outer surface of the adjacent tire to measure along a lateral Y-axis the distance from said tire to a selected reference line along said first checking plate parallel to said X-axis;

e. manually placing said scale on said first checking plate and extending same to abut against the outer surface of the adjacent tire guard or fender to measure along a lateral Y-axis the distance from said outer surface to said selected reference line along said first checking plate to determine if such distance is shorter than said measured distance to said tire;

f. repeating steps d and e with the second checking plate; and g. repeating steps c, d, e and f for the other three tires and related guards or fenders.

5. The method described in claim 4, wherein said first and second selected angles off vertical are 30° and 50°, respectively.

* * * * *